T. DOWLING.
Discharge-Pipe for Pump Spouts, Faucets, &c.
No. 208,722. Patented Oct. 8, 1878.
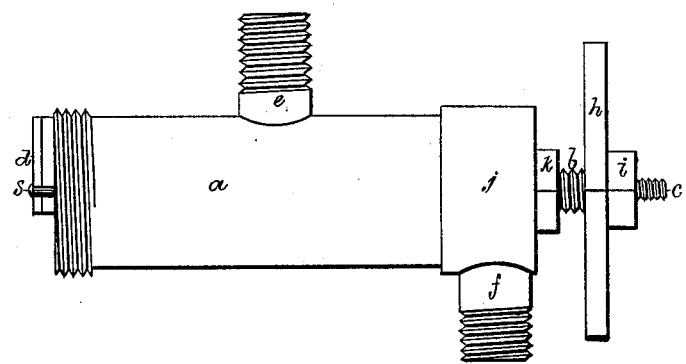
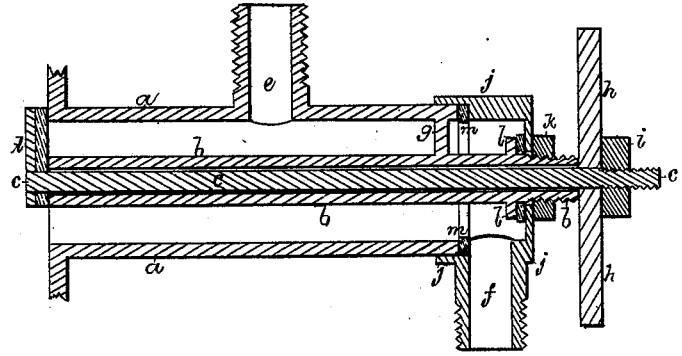
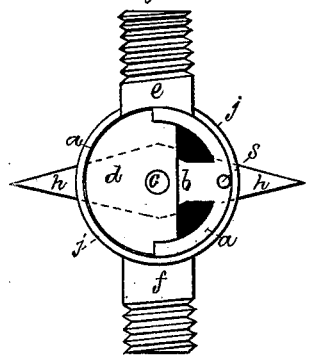

UNITED STATES PATENT OFFICE.

THOMAS DOWLING, OF GLOUCESTER, MASSACHUSETTS.

IMPROVEMENT IN DISCHARGE-PIPES FOR PUMP-SPOUTS, FAUCETS, &c.

Specification forming part of Letters Patent No. 208,722, dated October 8, 1878; application filed January 5, 1878.

*To all whom it may concern:*

Be it known that I, THOMAS DOWLING, of Gloucester, Massachusetts, have invented certain Improvements in Discharge-Pipes for Pump-Spouts, Faucets, &c.; and that the same are fully described in the following specification, and illustrated in the accompanying drawing.

The object of these improvements, especially applicable to faucets and pump-nozzles, is to provide a convenient device for directing the flow of a liquid to either of two discharge-orifices, and to permit the direction of discharge to be varied.

My invention consists in a double-channeled discharge-pipe, in combination with a rotary gate adapted to direct the liquid to either channel, and, in its rotation, to clear obstructions from its seat, upon which it is closed by mechanical pressure acting in concert with the flow of the liquid.

My invention also consists in a discharge-pipe for pump-spouts and faucets, provided with a rotary cap bearing a nozzle or orifice adjustable by rotation to any desired position.

My invention also consists in a double-channeled discharge-pipe having two nozzles, one of which is adjustable in the direction of its discharge with relation to the other.

The drawing illustrates the several features of my invention, Figure 1 being a side view; Fig. 2, a longitudinal section, and Fig. 3 an inner end view.

In the several figures, $a$ is the body of the tubular faucet or spout, divided longitudinally by a central partition, $b$, which is preferably enlarged at the axis to form a tube to receive the stem $c$, by which the gate $d$ is rotated within the barrel to which the spout is applied. The partition $b$ divides the tubular body into two channels, communicating, respectively, with the discharge-nozzles $e$ and $f$, the channel to the former terminating in the partition $g$, and that to the latter being unbroken. The liquid is directed to either channel by means of the gate $d$, rotated by the handle $h$ upon the other end of the stem $c$.

The tube $b$, which incloses the stem, is prolonged beyond the end of the body $a$, and the handle $h$ is pressed against the end of this prolongation by a nut, $i$, engaging with screw-threads on the stem $c$. The effect of this pressure is to tighten the gate $d$ upon its seat at the other end of the tube $a$, and consequently any wear thereon is at once remedied by tightening the nut $i$. Moreover, the pressure of the liquid itself tends to keep the gate closed on its seat, since it acts in the same direction as the nut and screw. The inner face of the gate is provided with a packing, secured thereto so as to turn with the gate. The stem $c$ is flattened or squared, where the handle is applied, to correspond in shape with the aperture in handle, so that the latter may move longitudinally upon the former, but cannot turn without it. The rotation of the gate in close contact with its seat serves to clear away any obstructions at that point. A suitable stop, $s$, is provided to prevent turning the gate too far either way.

Another peculiarity of my invention is a rotary cap, $j$, bearing the discharge-nozzle $f$. The object of this rotation is to vary at will the direction of flow through said nozzle, for convenience in attaching a hose or other pipe without the necessity of joints or short bends in making such connection. This feature of my invention is therefore equally applicable whether there is or is not an additional fixed nozzle.

In the drawing the nozzle $f$ is shown turned downward; but it may extend radially in any direction, and may be curved, if preferred.

The best method in which I have contemplated applying this improvement is shown in the drawing. The end of the cap $j$ has a central aperture, through which the tube $b$ projects, threaded to receive a nut, $k$, by which the end of the cap $j$ is pressed against a flanged collar, $l$, on the tube $b$, or against a packing-ring fixed thereon. Within the cap $j$ is a shoulder supporting a packing-ring, $m$, which is interposed between said shoulder and the end of the tube $a$. Thus an open waterway is maintained between the end of this tube and the end of the cap $j$, and through this space the liquid reaches the nozzle $b$, whatever its position. When the nut $k$ is tightened on the cap $j$ the two packing-rings are compressed, and preserve a water-tight joint between the tubes $a$ $b$ and the cap $j$.

It is obvious that the cap $j$ may be adjusted radially, and may be tightened or loosened by the nut $k$ without disturbing the handle $h$, or the gate which it operates.

When it is desired to permit a flow through both $e$ and $f$, the gate is turned to the position shown in Fig. 3.

I disclaim the continuously-rotating discharge pipe or jet, operating by the reaction of the escaping water, and well known in fountains, &c., as such a device would be worthless in connection with a faucet or pump.

I claim as of my invention—

1. A discharge-pipe having two exit-ports, in combination with a rotary gate adapted to be closed upon its seat by mechanical pressure acting in the same direction with the flow of the liquid, substantially as set forth.

2. A horizontal discharge-pipe for pump-spouts and faucets, provided with a nozzle adjustable thereon by rotation, and a screw-nut for securing the same in position when adjusted, substantially as set forth.

3. A discharge-pipe having two channels and provided with two nozzles, one of which is adjustable by rotation with relation to the other, substantially as set forth.

THOMAS DOWLING.

Witnesses:
CHAS. H. OXTON,
ALBERT E. DENNISON.